(12) United States Patent
Inokuchi et al.

(10) Patent No.: US 6,589,561 B2
(45) Date of Patent: Jul. 8, 2003

(54) AQUEOUS DISPERSION OF GLOBULAR SILICONE ELASTOMER PARTICLES

(75) Inventors: Yoshinori Inokuchi, Gunma-ken (JP); Ryuji Horiguchi, Gunma-ken (JP)

(73) Assignee: Shin-Etsu Chemical Co., Ltd. (JP)

( * ) Notice: Subject to any disclaimer, the term of this patent is extended or adjusted under 35 U.S.C. 154(b) by 43 days.

(21) Appl. No.: 09/879,886

(22) Filed: Jun. 14, 2001

(65) Prior Publication Data

US 2001/0055618 A1 Dec. 27, 2001

(30) Foreign Application Priority Data

Jun. 14, 2000 (JP) ........................................ 2000-178107

(51) Int. Cl.⁷ ................................................ A61K 9/14
(52) U.S. Cl. ........................ 424/489; 424/490; 424/401; 424/497; 424/496
(58) Field of Search .................................. 424/489, 490, 424/401, 497, 496

(56) References Cited

U.S. PATENT DOCUMENTS 4,370,160 A  *  1/1983  Ziemelis ...................... 264/4.1
6,017,993 A  *  1/2000  Maeda et al. ................ 523/207

OTHER PUBLICATIONS

International Cosmetic Ingredient Dictionary and Handbook, vol. 2, 7ᵗʰ edition, Washington DC, 1997, pp 1629–1630.*

* cited by examiner

*Primary Examiner*—Thurman K. Page
*Assistant Examiner*—Amy E Pulliam
(74) *Attorney, Agent, or Firm*—Millen, White, Zelano, Branigan, P.C.

(57) ABSTRACT

The invention discloses an aqueous slurry of globular particles of a silicone-based composite elastomer consisting of titanium dioxide particles and a crosslinked silicone elastomer as the matrix for the titanium dioxide particles. The aqueous dispersion comprises from 10 to 60% of the globular elastomer particles of 0.1 to 100 $\mu$m diameter, from 0.1 to 30% by weight of a surfactant which is preferably an anionic surfactant such as a salt of a dialkyl sulfosuccinate and the balance of water. The aqueous dispersion of the globular elastomer particles is quite satisfactory as an ultraviolet-shielding adjuvant in water-base cosmetic or toiletry preparations in respect of good stability of dispersion, high ultraviolet-shielding power and surface lubricity.

16 Claims, No Drawings

AQUEOUS DISPERSION OF GLOBULAR SILICONE ELASTOMER PARTICLES

BACKGROUND OF THE INVENTION

The present invention relates to a novel aqueous dispersion of globular silicone elastomer particles or, more particularly, the invention relates to an aqueous dispersion of globular particles of a composite silicone elastomer, of which each particle has a composite structure consisting of a crosslinked organopolysiloxane as the matrix phase and pigment particles as the dispersed phase in the matrix phase, having usefulness as an adjuvant in toiletry or cosmetic preparations.

A dry powder or an aqueous dispersion of globular silicone elastomer particles is a well known material in the prior art. For example, several methods are proposed for the preparation of such a product including a method in which an organopolysiloxane having silicon-bonded vinyl groups and an organohydrogenpolysiloxane having silicon-bonded hydrogen atoms are co-emulsified in an aqueous medium containing a surfactant to give an aqueous emulsion which is then admixed with a catalytic amount of a platinum compound as a catalyst for the hydrosilation reaction between the silicon-bonded vinyl groups and silicon-bonded hydrogen atoms to effect crosslinking (see Japanese Patent Kokai 56-36546, 62-257939 and 3-93834), a method in which a curable organopolysiloxane composition is sprayed and heated in a hot air atmosphere to effect curing (see Japanese Patent Kokai 59-68333), a method in which a mixture consisting of an organopolysiloxane having silicon-bonded alkenyl groups, an organohydrogenpolysiloxane and a catalytic platinum compound is emulsified in water at 0 to 25° C. and the aqueous emulsion is added to and dispersed in water at 25° C. or higher (see Japanese Patent Kokai 62-243621 and 63-77942), a method in which a mixture consisting of an organopolysiloxane having olefinically unsaturated groups bonded to the silicon atoms and an organohydrogenpolysiloxane having mercaptoalkyl groups is emulsified in an aqueous medium and irradiated with ultraviolet light to effect curing of the droplets (see Japanese Patent Kokai 60-106837), a method in which a mixture of an amino group-containing organopolysiloxane and a second organopolysiloxane having acrylic-functional groups is emulsified in an aqueous medium to effect in situ curing (see Japanese Patent Kokai 63-128075), a method in which a mixture consisting of an organopolysiloxane having silanol groups, an organohydrogenpolysiloxane and a curing catalyst is dispersed in an aqueous medium and then brought into contact with a liquid or gas at a high temperature to effect curing (see Japanese Patent Kokai 63-202658), a method in which an organopolysiloxane having acryloxy, methacryloxy or acrylamido groups is dispersed in a liquid medium and irradiated with ultraviolet light to effect curing (see Japanese Patent Kokai 63-258639), a method in which a mixture of organosilicon compounds selected from organosilane compounds and organopolysiloxanes is subjected to a condensation reaction to effect curing in a solvent mainly consisting of a nitrogen-containing aromatic compound in the presence of a—condensation catalyst (see Japanese Patent Kokai 63-312324), a method in which a mixture of organosilicon compounds selected from organosilane compounds and organopolysiloxanes is subjected to a condensation reaction to effect curing in a solvent mainly consisting of an amine, amide or nitrile compound in the presence of a condensation catalyst (see Japanese Patent Kokai 63-312325), a method in which a mixture of a vinyl group-containing organopolysiloxane, organohydrogenpolysiloxane and catalytic platinum compound is emulsified followed by curing (see Japanese Patent Kokai 1-306471), a method in which an organopolysiloxane having silicon-bonded aliphatically unsaturated groups and mercapto groups is emulsified to give an aqueous emulsion which is irradiated with ultraviolet light in the presence of a photosensitizer to effect curing (see Japanese Patent Kokai 3-95268), a method in which a vinyl group-containing organohydrogenpolysiloxane in the form of an aqueous emulsion is subjected to curing in a gas or in a non-miscible liquid at 25° C. or higher (see Japanese Patent Kokai 4-72358), a method in which a mixture consisting of a vinyl group-containing organopolysiloxane, organohydrogenpolysiloxane and catalytic platinum compound is sprayed through a nozzle into water and emulsified therein followed by curing (see Japanese Patent Kokai 61-223032, 1-178523 and 2-6109) and so on.

Further, Japanese Patent Kokai 10-139624 discloses a cosmetic preparation with water as the dispersion medium by the addition and compounding of an aqueous dispersion of a silicone rubber powder. While these silicon elastomer particles prepared by the above described methods may exhibit an improvement in the lubricity when compounded in a cosmetic preparation, a disadvantage is caused thereby due to a decrease in the ultraviolet-shielding effect of the cosmetic preparations. In addition, a cosmetic preparation of which water is the dispersion medium of effective ingredients suffers a problem when compounded with globular silicone elastomer particles that the silicone elastomer particles are separated from the base of the cosmetic preparation because the silicone elastomer particles have a true density smaller than that of the dispersion medium.

On the other hand, proposals are made for silicone elastomer particles compounded with a non-silicone material. For example, Japanese Patent Kokai 63-251464 discloses silicone elastomer particles containing an electroconductive material such as carbon blacks. Although good ultraviolet-shielding effect can be obtained with such carbon black-containing silicone elastomer particles, these particles can hardly be employed as an adjuvant in a cosmetic or toiletry preparation because the particles are naturally colored in black so deeply. Japanese Patent Kokai 64-56735 discloses silicone elastomer particles compounded with an epoxy compound having an unsaturated hydrocarbon group in the molecule. Japanese Patent Kokai 64-70558 discloses silicone elastomer particles compounded with an alkoxysilane compound having an epoxy, alkenyl or amino group in the molecule. Japanese Patent Kokai 1-81856 discloses silicone elastomer particles compounded with a silicone oil. Japanese Patent Kokai 2-218710 discloses silicone elastomer particles compounded with particles of a thermoplastic resin. Japanese Patent Kokai 2-232263 discloses silicone elastomer particles compounded with fumed silica particles or precipitated silica particles. Japanese Patent Kokai 4-168117 discloses silicone elastomer particles compounded with precipitated silica particles after a surface treatment with an organopolysiloxane. Japanese Patent Kokai 3-281536 and 10-36675 disclose silicone elastomer particles compounded with colloidal silica particles. Japanese Patent Kokai 11-1615 discloses silicone elastomer particles compounded with a cationic surfactant.

The above described products of silicone elastomer-based particles compounded with a variety of additive ingredients, however, cannot be imparted with an ultraviolet-shielding effect substantially higher than in silicone elastomer particles uncompounded with such an additive ingredient.

Moreover, silicone elastomer particles compounded with silica particles before a surface treatment suffer a decrease in the surface lubricity. Further, Japanese Patent Kokai 3-294357 proposes a method for the preparation of silicone elastomer particles containing additive particles in which an organopolysiloxane composition curable into a silicone elastomer is blended before curing with the additive particles to be carried by the additive particles followed by curing of the organopolysiloxane into an elastomer. This method, however, involves difficult problems that the particles can hardly be imparted with good globularity or sphericity of the particle configuration and the particle diameter of the particles can be controlled only with a great difficulty.

It is widely practiced in the prior art that a cosmetic preparation is compounded with fine particles of titanium dioxide as an ultraviolet-shielding agent though with a problem that the cosmetic preparation compounded with titanium dioxide particles suffers a decrease in the lubricity in addition to the problem due to poor dispersibility of titanium dioxide particles in cosmetic preparations in general. Accordingly, it is eagerly desired to provide a cosmetic preparation compounded with titanium dioxide particles capable of exhibiting excellent ultraviolet-shielding effect along with excellent surface lubricity and dispersibility therein.

SUMMARY OF THE INVENTION

The present invention accordingly has an object to provide an aqueous dispersion of globular particles of a silicone-based elastomer which is suitable as an adjuvant ingredient in a cosmetic preparation to exhibit a high ultraviolet-shielding effect and good surface lubricity with good dispersibility.

Thus, the present invention provides an aqueous dispersion of globular particles of a silicone-based elastomer which comprises:

(A) from 10 to 60% by weight or, preferably, from 30 to 60% by weight of globular particles of a silicone-based composite elastomer having an average particle diameter in the range from 0.1 to 100 μm and consisting of (A1) from 0.1 to 50% by weight of particles of titanium dioxide and (A2) from 99.9 to 50% by weight of a crosslinked organopolysiloxane, as a matrix phase for the component (A1), comprising at least 70% by moles of diorganosiloxane units represented by the general unit formula —(—SiR$_2$—O—)—, in which R is a monovalent hydrocarbon group having 1 to 6 carbon atoms;

(B) from 0.1 to 30% by weight or, preferably, from 1 to 10% by weight of a surfactant, which is preferably an anionic surfactant such as a water-soluble salt of a dialkyl sulfosuccinate; and (C) the balance of the components (A) and (B) to 100% by weight of water as a dispersion medium or dissolving medium of the components (A) and (B).

DETAILED DESCRIPTION OF THE PREFERRED EMBODIMENTS

In the inventive aqueous dispersion, the dispersed phase is provided by globular particles of a silicone-based composite elastomer as the component (A) having an average particle diameter in the range from 0.1 to 100 μm or, preferably, from 1 to 30 μm. When the average particle diameter thereof is too small, the cosmetic preparation compounded therewith cannot be imparted with fully improved surface lubricity while, when too large, the cosmetic preparation may exhibit a coarse and rough touch feeling along with poor surface lubricity of the skin finished with the cosmetic preparation.

It is preferable that the titanium dioxide particles as the component (A1) to form the dispersed phase in the matrix of the crosslinked organopolysiloxane (A2) of the composite elastomer are imparted in advance with improved dispersibility in the matrix phase by a hydrophobilizing surface treatment with an organohydrogenpolysiloxane under heating.

It is essential that the organopolysiloxane forming the matrix phase (A2) of the globular particles of the silicone-based composite elastomer comprises at least 70% or, preferably, at least 80% by moles of diorganosiloxane units represented by the general unit formula —(—SiR$_2$—O—)—, in which R denotes a monovalent hydrocarbon group having 1 to 6 carbon atoms exemplified by alkyl groups such as methyl, ethyl, propyl, butyl, pentyl and hexyl groups, aryl groups such as phenyl group and cycloalkyl groups such as cyclopentyl and cyclohexyl groups as well as those substituted hydrocarbon groups obtained by replacing a part or all of the hydrogen atoms in the above named unsubstituted hydrocarbon groups with halogen atoms, cyano groups and the like such as chloromethyl, 3,3,3-trifluoropropyl and cyanomethyl groups, of which methyl group is particularly preferable as R in respect of the good surface lubricity imparted to the silicone elastomer particles. When the molar fraction of the diorganosiloxane units in the organopolysiloxane (A2) is too small, the particles cannot be imparted with full surface lubricity.

The types of the crosslinking reaction of the organopolysiloxane to form the crosslinked organopolysiloxane as the matrix phase (A2) of the globular particles are not particularly limitative including the hydrosilation addition reaction, condensation reaction and ultraviolet- or radiation-induced reaction, of which the hydrosilation reaction in the presence of a catalytic platinum compound is preferable. Namely, a crosslinked organopolysiloxane by this method can be obtained by heating an organopolysiloxane composition consisting of an organopolysiloxane having at least two alkenyl groups, e.g., vinyl groups, in a molecule and an organohydrogenpolysiloxane having at least two silicon-bonded hydrogen atoms in a molecule with admixture of a platinum compound.

The above mentioned alkenyl group-containing organopolysiloxane to be reacted with an organohydrogenpolysiloxane is represented by the average unit formula $R^1{}_aR^2{}_b$SiO$_{(4-a-b)/2}$, in which $R^1$ is a monovalent hydrocarbon group having 1 to 6 carbon atoms and free from aliphatic unsaturation, $R^2$ is an alkenyl group having 2 to 6 carbon atoms, the subscript a is 0 or a positive number not exceeding 3 and the subscript b is a positive number not exceeding 3 with the proviso that a+b is in the range from 0.1 to 3 or, preferably, a is 0 or a positive number not exceeding 2.295 and b is a positive number of 0.005 to 2.3 with the proviso that a+b is in the range from 0.5 to 2.3. The alkenyl group $R^2$ is exemplified by vinyl, allyl, propenyl, butenyl, pentenyl and hexenyl groups. The alkenyl group-containing organopolysiloxane should have a viscosity in the range from 1 to 10000 mm$^2$/s or, preferably, from 5 to 3000 mm$^2$/s at 25° C. The curability of the organopolysiloxane composition would be adversely affected when the viscosity of the alkenyl group-containing organopolysiloxane is too low while, when the viscosity is too high, difficulties are encountered in obtaining globular particles having a narrow particle diameter distribution. The molecular structure of the alkenyl group-containing organopolysiloxane is not particularly limitative including straightly linear, cyclic and branched structures of which a straightly linear structure is preferable.

The organohydrogenpolysiloxane to be reacted with the above described alkenyl group-containing organopolysiloxane is represented by the average unit formula $R^1_c H_d SiO_{(4-c-d)/2}$, in which $R^1$ has the same meaning as defined above, the subscript c is 0 or a positive number not exceeding 3 and the subscript d is a positive number not exceeding 3 with the proviso that c+d is in the range from 0.1 to 3 or, preferably, c is 0 or a positive number not exceeding 2.295 and d is a positive number of 0.005 to 2.3 with the proviso that c+d is in the range from 0.5 to 2.3. The organohydrogenpolysiloxane should have a viscosity in the range from 1 to 10000 mm²/s or, preferably, from 5 to 3000 mm²/s at 25° C. The curability of the organopolysiloxane composition would be adversely affected when the viscosity of the organohydrogenpolysiloxane is too low while, when the viscosity is too high, difficulties are encountered in obtaining globular particles having a narrow particle diameter distribution. The molecular structure of the organohydrogenopolysiloxane is not particularly limitative including straightly linear, cyclic and branched structures of which a straightly linear structure is preferable.

The compounding proportion of the alkenyl group-containing organopolysiloxane and the organohydrogenpolysiloxane should be such that from 0.5 to 5 or, preferably, from 0.8 to 2 silicon-bonded hydrogen atoms in the organohydrogenpolysiloxane are provided per each alkenyl group in the alkenyl group-containing organopolysiloxane. When the amount of the silicon-bonded hydrogen atoms is too small, sufficient curing of the organopolysiloxane composition can hardly be accomplished while, when the amount thereof is too large, a decrease is caused in the physical properties of the crosslinked silicone elastomer forming the matrix phase of the globular particles.

Following is a description of the procedure for the preparation of the inventive aqueous dispersion of globular particles of a silicone-based composite elastomer. In the first place, titanium dioxide particles are dispersed in a crosslinkable organopolysiloxane composition comprising an alkenyl group-containing organopolysiloxane and an organohydrogenpolysiloxane. It is optional here that a dispersing agent is admixed to the mixture in order to improve dispersibility of the titanium dioxide particles in the organopolysiloxane composition. The dispersing agent suitable for the purpose is exemplified by an acrylic-silicone graft copolymer prepared by polymerizing a free-radical-polymerizable monomer which is typically an acrylate or methacrylate ester compound in the presence of a dimethylpolysiloxane terminated at a single molecular chain end with a radical-polymerizable functional group. An example of the procedure for the preparation of such an acrylic-silicone graft copolymer suitable for use as a dispersing agent is described below.

The above mentioned dimethylpolysiloxane terminated at a single molecular chain end with a radical-polymerizable group, e.g., a (meth)acryloxyalkyl group, which serves as the silicone moiety of the graft copolymer, is represented by the general structural formula

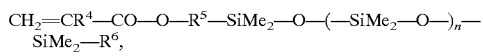
CH₂=CR⁴—CO—O—R⁵—SiMe₂—O—(—SiMe₂—O—)ₙ—SiMe₂—R⁶, in which Me is a methyl group, $R^4$ is a hydrogen atom or a methyl group, $R^5$ is an alkylene group having 1 to 10 carbon atoms optionally interrupted by one or two ether linkages, $R^6$ is an alkyl group having 1 to 4 carbon atoms and the subscript n is an average number in the range from 3 to 300.

On the other hand, the organic radical-polymerizable monomer to be graft-copolymerized with the above described (meth)acryloxyalkyl-terminated dimethyl polysiloxane is preferably an ester compound of (meth)acrylic acid exemplified by alkyl (meth)acrylates such as methyl (meth)acrylate, ethyl (meth)acrylate, n-butyl (meth)acrylate and 2-ethylhexyl (meth)acrylate, hydroxyalkyl (meth)acrylates such as 2-hydroxyethyl (meth)acrylate and 2-hydroxypropyl (meth)acrylate and perfluoroalkyl-substituted alkyl (meth) acrylates, of which the perfluoroalkyl group has 1 to 10 carbon atoms.

The graft copolymerization of the above described radical-polymerizable silicone compound and the (meth) acrylate ester compound is conducted in the presence of a free-radical polymerization initiator such as dibenzoyl peroxide, dilauroyl peroxide, azobisisobutyronitrile and the like. The type of the graft copolymerization reaction is not particularly limitative including the solution polymerization, emulsion polymerization, suspension polymerization and bulk polymerization, of which solution polymerization is preferred in respect of the good controllability of the average molecular weight of the graft copolymer obtained by the reaction.

The amount of the above described acrylic-silicone graft copolymer added to the curable organopolysiloxane composition as a dispersing agent for the titanium dioxide particles is in the range, usually, from 0.1 to 30 parts by weight or, preferably, from 0.5 to 10 parts by weight per 100 parts by weight of titanium dioxide particles compounded with the silicone composition. When the amount of the dispersing agent is too small, the desired improvement in the dispersibility of the titanium dioxide particles cannot be fully accomplished as a matter of course while, when the amount thereof is too large, the resultant composite silicone elastomer particles would suffer a decrease in various properties.

The amount of the titanium dioxide particles as the dispersed phase in the globular particles of the silicone-based composite elastomer is in the range from 0.1 to 50% by weight or, preferably, from 1 to 30% by weight based on the total amount of the silicone compound and the titanium dioxide particles. When the amount of the titanium dioxide particles is too small, the desirable ultraviolet-shielding effect cannot be fully exhibited while, when the amount is too large, a difficulty is encountered in uniformly dispersing the curable silicone-based composition in an aqueous medium. The true density of the composite silicone elastomer particles can be controlled within a range from 0.97 to 2.5 g/cm³ by varying the relative amount of the titanium dioxide particles.

The aqueous dispersion of the globular composite silicone elastomer particles according to the present invention can be prepared by uniformly dispersing a curable silicone elastomer composition containing titanium dioxide particles in water together with a surfactant by using a suitable stirrer machine such as a homomixer.

The surfactant used here as the component (B) is not particularly limitative relative to the ionic types so that any of the surfactants belonging to the classes of non-ionic, anionic, cationic and amphoteric ones can be used, of which anionic surfactants are preferred.

Examples of the non-ionic surfactants include sorbitan fatty acid esters, glycerin fatty acid esters, polyglycerin fatty acid esters, propyleneglycol fatty acid esters, polyethyleneglycol fatty acid esters, sucrose fatty acid esters, polyoxyethylene alkyl ethers, polyoxyethylene-polyoxypropylene alkyl ethers, polyoxyethylene alkylphenyl ethers, polyoxyethylene sorbitan fatty acid esters, polyoxyethylene sorbitol fatty acid esters, polyoxyethylene glycerin fatty acid esters, polyoxyethylene-polyoxypropylene glycols, polyoxyethylene castor oils, polyoxyethylene hardened castor oils, polyoxyethylene phytostanol ethers, polyoxyethylene phytosterol ethers, polyoxyethylene cholestanol ethers, polyoxyethylene cholesteryl ethers, polyoxyalkylene-modified organopolysiloxanes, polyoxyalkylene-alkyl co-modified organopolysiloxanes, alkylalkanolamides, sugar esters and sugar amides.

Examples of the anionic surfactant suitable as the component (B) include fatty acid soaps, polyoxyethylene alkyd ether carboxylic acid salts, salts of an N-acylamino acid, polyoxyethylene amidoether carboxylic acid salts, salts of a monoalkyl sulfosuccinic acid, salts of a dialkyl sulfosuccinic acid, salts of a polyoxyethylene alkyl ether sulfosuccinic acid, salts of an α-sulfo fatty acid ester, α-acyl sulfonic acids, salts of an alkylbenzene sulfonic acid, salts of an α-olefin sulfonic acid, salts of a fatty acid ester sulfonic acid, salts of an N-acyl taurinic acid, salts of a naphthalene-sulfonic acid and formaldehyde condensation products thereof, salts of an alkylsulfuric acid ester, salts of a polyoxyethylene alkyl ether sulfuric acid ester, salts of a polyoxyethylene alkylphenyl ether sulfuric acid ester, salts of a fatty acid ester sulfuric acid ester, salts of a fatty acid alkylolamide sulfuric acid ester, tall oil, salts of an alkylphosphoric acid, salts of an alkenylphosphoric acid, salts of a polyoxyethylene alkyl ether phosphoric acid, salts of a polyoxyethylene alkylphenyl ether phosphoric acid and salts of an alkylamide phosphoric acid.

Examples of the cationic surfactant include alkyl trimethylammonium salts, dialkyl dimethylammonium salts, triethanolamine-difatty acid salt quaternary salts, amine salts such as salts of an alkylamine and polyamine and aminoalcohol fatty acid derivatives, alkyl quaternary ammonium salts, aromatic quaternary ammonium salts, pyridinium salts, imidazolium salts and dialkylpyridinium salts.

Examples of the amphoteric surfactant include alkyl dimethylamine oxides, alkyl carboxybetaines, alkyl sulfobetaines, salts of an amidoamino acid, phosphatidyl choline and imidazoline derivatives.

Among the above described four classes of surfactants, the anionic surfactants are preferable, of which salts of a dialkyl sulfosuccinic acid such as sodium diisobutyl sulfosuccinate, sodium dihexyl sulfosuccinate, sodium dicyclohexyl sulfosuccinate, sodium di(2-ethylhexyl) sulosuccinate and sodium dioctyl sulfosuccinate are more preferable.

The amount of the globular particles of the silicone-based composite elastomer as the component (A) in the inventive aqueous dispersion is in the range from 10 to 60% by weight or, preferably, from 30 to 60% by weight. When the content of the composite silicone elastomer particles is too small, an economical disadvantage is caused because an unduly large volume of the aqueous dispersion must be handled for obtaining a desired amount of the silicone elastomer particles. When the amount of the composite silicone elastomer particles in the aqueous dispersion is too large, on the other hand, the aqueous dispersion would have an unduly high consistency to cause an inconvenience in handling.

The amount of the surfactant as the component (B) in the inventive aqueous dispersion is in the range from 0.1 to 30% by weight or, preferably, from 1 to 10% by weight. When the amount of the component (B) is too small or too large, difficulties are encountered in obtaining a stable dispersion of the composite silicone elastomer particles in the aqueous dispersion medium.

A typical procedure for the preparation of the globular particles of a silicone-based composite elastomer is as follows. Thus, a mixture is prepared from titanium dioxide particles and a crosslinkable organopolysiloxane composition and the mixture is dispersed as droplets in an aqueous medium containing a surfactant followed by an in situ crosslinking reaction of the organopolysiloxane composition, optionally, at an elevated temperature to form crosslinked silicone elastomer particles containing titanium dioxide particles.

The types of the above mentioned crosslinking reaction are not particularly limitative but an organopolysiloxane composition crosslinkable by the mechanism of the platinum- or palladium-catalyzed hydrosilation addition reaction is preferred. Examples of preferable catalytic compounds include chloroplatinic acid, complexes thereof with an olefin or a vinylsiloxane and alcohol-modified chloroplatinic acid. The amount of the catalytic platinum compound is in the range from 1 to 100 ppm by weight calculated as the platinum element based on the amount of the crosslinkable organopolysiloxane composition consisting of a vinyl group-containing diorganopolysiloxane and an organohydrogenpolysiloxane. When the amount of the platinum catalyst is too small, the crosslinking reaction cannot proceed at a desirable high rate while no particular advantages can be obtained by increasing the amount thereof to exceed the above mentioned upper limit rather with an economical disadvantage due to expensiveness of the platinum compound.

The aqueous dispersion of the globular particles of the silicone-based composite elastomer obtained in the above described manner can be used by adding to a variety of water-based materials either as such or after further dilution with water. If necessary, the aqueous dispersion can be admixed with an additional amount of a surfactant. A dry powder of the globular particles can be obtained by dehydrating and drying the aqueous dispersion in a known procedure. Silicone resin-coated silicone elastomer particles can be prepared therefrom according to the method disclosed in Japanese Patent Kokai 7-196815.

In the following, the aqueous dispersion of the present invention is described in more detail by way of Examples, which, however, never limit the scope of the invention in any way. The values of viscosity appearing in the following Examples are all the values obtained by the measurement at 25° C.

EXAMPLE 1

A crosslinkable organopolysiloxane mixture was prepared by agitating 361 g of a methylvinylpolysiloxane having a viscosity of 600 mm²/s and expressed by the structural formula

Vi—SiMe$_2$—O—(—SiMe$_2$—O—)$_{180}$—SiMe$_2$—Vi, in which Me is a methyl group and Vi is a vinyl group, and 14 g of a methylhydrogenpolysiloxane having a viscosity of 25 mm²/s and expressed by the structural formula

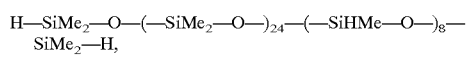

H—SiMe$_2$—O—(—SiMe$_2$—O—)$_{24}$—(—SiHMe—O—)$_8$—SiMe$_2$—H, to give a Si—H:Si—Vi molar ratio of 1.1 with addition of 125 g of a powder of titanium dioxide particles (SI-UFTR-Z, a product by Miyoshi Kasei Co.), which were after a surface coating treatment with a methylhydrogenpolysiloxane under heating, in a glass beaker of 1 liter capacity by using a homomixer rotating at 2000 rpm. The mixture was further admixed with an aqueous solution prepared by dissolving 20 g of sodium dioctyl sulfosuccinate in 200 g of water and agitated by using the homomixer rotating at 6000 rpm to give an oil-in-water emulsion which was further agitated at 6000 rpm for 10 minutes and then at 2000 rpm with addition of additional 278 g of water.

The aqueous emulsion was transferred into a glass flask equipped with a stirrer of plate blades and admixed with a mixture of 0.6 g of a toluene solution of a chloroplatinic acid-olefin complex containing 0.5% by weight of chloroplatinic acid and 1.2 g of a polyoxyethylene (9 moles of ethylene oxide addition) lauryl ether to effect the reaction under agitation at room temperature for 24 hours so as to give an aqueous dispersion of globular particles of a titanium dioxide-containing silicone-based composite elastomer. The aqueous dispersion thus formed was passed through a metal wire screen strainer of 200 mesh opening to remove any coarse particles. The aqueous dispersion was subjected to the measurement of the particle diameter by using a granulometric instrument for particle size determination (Model Multisizer II, manufactured by Beckmann Coulter Co.) to give an average particle diameter of 3.7 μm. The aqueous dispersion was subjected to spray drying to give a white powder having elasticity consisting of globular particles as examined under an optical microscope, which had a true density of 1.8 g/cm$^3$.

EXAMPLE 2

The procedure for the preparation of an aqueous dispersion of titanium dioxide-containing globular particles of a composite silicone elastomer was substantially the same as in Example 1 excepting for the replacement of the surface-treated titanium dioxide particles (SI-UFTR-Z) with the same amount of titanium dioxide particles of another grade (TTO-S-2, a product by Ishihara Sangyo Co.), additional admixture of the organopolysiloxane mixture with 6 g of a methacrylicsilicone graft copolymer in the form of a 30% solution in decamethyl cyclopentasiloxane (KP-545, a product by Shin-Etsu Chemical Co.) and decrease of the amount of water from 478 g to 472 g.

The particles of the thus obtained aqueous dispersion had an average particle diameter of 4.1 μm. Spray drying of the aqueous dispersion gave a white powder with elasticity consisting of globular particles having a true density of 1.8 g/cm$^3$.

EXAMPLE 3

The procedure for the preparation of an aqueous dispersion of titanium dioxide-containing globular particles of a composite silicone elastomer was substantially the same as in Example 1 excepting for an increase of the amount of the methylvinylpolysiloxane from 361 g to 476 g, increase of the amount of the methylhydrogenpolysiloxane from 14 g to 19 g and decrease of the amount of the titanium dioxide powder from 125 g to 5 g.

The results of the evaluation tests of the aqueous dispersion were similar to Example 1 to give an average particle diameter of 3.6 μm and a true density of 1.0 g/cm$^3$ of the particles of the spray-dried powder having elasticity. The aqueous dispersion was stable without settling of the particles even after storage for one month at room temperature presumably due to the proximity of the true density of the particles to that of the dispersion medium.

EXAMPLE 4

The procedure for the preparation of an aqueous dispersion of titanium dioxide-containing globular particles of a composite silicone elastomer was substantially the same as in Example 1 excepting for the replacement of 361 g of the methylvinylpolysiloxane with 323 g of another methylvinylpolysiloxane having a viscosity of 60 mm$^2$/s and expressed by the structural formula

Vi—SiMe$_2$—O—(—SiMe$_2$—O—)$_{43}$—SiMe$_2$—Vi,

In which each symbol has the same meaning as defined above, and increase of the amount of the methylhydrogenpolysiloxane from 14 g to 52 g to give a Si—H to Si—Vi molar ratio of 1.1.

The results of the evaluation tests of the aqueous dispersion were similar to Example 1 to give an average particle diameter of 3.2 μm and a true density of 1.8 g/cm$^3$ of the particles of the spray-dried powder having elasticity.

EXAMPLE 5

The procedure for the preparation of an aqueous dispersion of titanium dioxide-containing globular particles of a composite silicone elastomer was substantially the same as in Example 1 excepting for an increase of the amount of the sodium dioctyl sulfosuccinate from 20 g to 50 g and decrease of the amount of water from 478 g to 448 g.

The results of the evaluation tests of the aqueous dispersion were similar to Example 1 to give an average particle diameter of 2.5 μm and a true density of 1.8 g/cm$^3$ of the particles of the spray-dried powder having elasticity.

Comparative Example 1

An organopolysiloxane mixture prepared from 231 g of the same methylvinylpolysiloxane and 9 g of the same methylhydrogenpolysiloxane as used in Example 1 with addition of 260 g of the same surface-treated titanium dioxide particles was agitated in a glass beaker of 1 liter capacity with a homomixer rotating at 2000 rpm followed by the addition of an aqueous solution of 20 g of sodium dioctyl sulfosuccinate in 200 g of water and further agitation at 6000 rpm not to give an aqueous emulsion of the oil-in-water type. No aqueous emulsion of the oil-in-water type could be obtained by further addition of 278 g of water under agitation.

Comparative Example 2

The procedure for the preparation of an aqueous dispersion of globular particles of a composite silicone elastomer was substantially the same as in Example 1 excepting for an increase of the amount of the methylvinylpolysiloxane from 361 g to 481 g, increase of the amount of the methylhydrogenpolysiloxane from 14 g to 19 g to give an Si—H to Si—Vi molar ratio of 1.1 and omission of the titanium dioxide particles.

The results of the evaluation tests of the aqueous dispersion were similar to Example 1 to give an average particle diameter of 3.2 μm and a true density of 0.97 g/cm$^3$ of the particles of the spray-dried powder having elasticity.

What is claimed is:

1. An aqueous dispersion of globular particles of a silicone-based composite elastomer which comprises:
   (A) from 10 to 60% by weight of globular particles of a silicone-based composite elastomer having an average particle diameter in the range from 0.1 to 100 μm and consisting of (A1) from 0.1 to 50% by weight of particles of titanium dioxide and (A2) from 99.9 to 50% by weight of a crosslinked organopolysiloxane as a cladding layer of the component (A1) comprising at least 70% by moles of diorganosiloxane units represented by the general unit formula —(—SiR$_2$—

—(—O—)—, in which R is a monovalent hydrocarbon group having 1 to 6 carbon atoms, wherein the crosslinked organopolysiloxane is a reaction product of a hydrosilation reaction in an organopolysiloxane composition comprising an organopolysiloxane having at least two alkenyl groups per molecule and an organohydrogenpolysiloxane having at least two silicon-bonded hydrogen atoms per molecule with admixture of a platinum compound, and wherein the particles of titanium dioxide have a surface-treatment layer of an organohydrogenpolysiloxane as an undercoating layer of the cladding layer of the component (A2);

(B) from 0.1 to 30% by weight of a surfactant which is a salt of dialkyl sulfosuccinate; and (C) the balance of the components (A) and (B) to 100% by weight of water as a dispersion medium or dissolving medium of he components (A) and (B).

2. The aqueous dispersion of globular particles of a silicone-based composite elastomer as claimed in claim 1, wherein the coating amount of the organohydrogenpolyssiloxane for the surface-treatment layer is in the range from 0.1 to 20 parts by weight per 100 parts by weight of uncoated particles of titanium dioxide.

3. The aqueous dispersion of globular particles of a silicone-based composite elastomer as claimed in claim 1 in which the particles of the titanium dioxide as the component (A1) are compounded, prior to mixing with the component (A2), with an acrylic-silicone graft copolymer in an amount in the range from 1 to 30 parts by weight per 100 parts by weight of the titanium dioxide particles.

4. The aqueous dispersion of globular particles of a silicone-based composite elastomer as claimed in claim 1 in which the amount of the component (A) is in the range from 30 to 60% by weight and the amount of the component (B) is in the range from 1 to 10% by weight.

5. A dry powder of globular particles of a silicone-based composite elastomer which is a dehydration product of the aqueous dispersion as defined in claim 1.

6. An aqueous dispersion according to claim 1, wherein said globular particles have an average particle diameter of 1–30 μm.

7. An aqueous dispersion according to claim 1, wherein components (A2) comprises at least 80% by moles of diorganosiloxane units represented by the formula —(—$SiR_2$—O—)—.

8. An aqueous dispersion according to claim 1, wherein R is alkyl, aryl, or cycloalkyl which in each case is unsubstituted or substituted by halogen or cyano groups.

9. An aqueous dispersion according to claim 8, wherein R is methyl, ethyl, propyl, butyl, pentyl, hexyl, phenyl, cyclopentyl, cyclohexyl, chloromethyl, 3,3,3-trifluoropropyl, or cyanomethyl.

10. An aqueous dispersion according to claim 1, wherein said alkenyl group-containing organopolysiloxane is represented by the average unit formula $R^1_a R^2_b SiO_{(4-a-b)/2}$ wherein $R^1$ is a monovalent hydrocarbon group having 1 to 6 carbon atoms and is free from aliphatic unsaturation, $R^2$ is an alkenyl group having 2 to 6 carbon atoms, subscript a is 0 or positive number not exceeding 3, and subscript b is a positive number not exceeding 3, with the proviso that a+b is 0.1 to 3.

11. An aqueous dispersion according to claim 10, wherein subscript a is 0 or positive number not exceeding 2.295 and subscript b is a positive number of 0.005 to 2.3, with the proviso that a+b is 0.5 to 2.3.

12. An aqueous dispersion according to claim 10, wherein $R^2$ is vinyl, allyl, propenyl, butenyl, pentenyl or hexenyl groups.

13. An aqueous dispersion according to claim 1, wherein the organohydrogenpolysiloxane which is reactive with the alkenyl group-containing organopolysiloxane is represented by the average unit formula $R^1_c H_d SiO_{(4-c-d)/2}$, wherein $R^1$ a monovalent hydrocarbon group having 1 to 6 carbon atoms, subscript c is 0 or a positive number not exceeding 3, and subscript d is a positive number not exceeding 3, with the proviso that c+d is 0.1 to 3.

14. An aqueous dispersion according to claim 13, wherein subscript c is 0 or positive number not exceeding 2.295 and subscript d is a positive number of 0.005 to 2.3, with the proviso that c+d is 0.5–2.3.

15. An aqueous dispersion according to claim 10, wherein the proportion of said alkenyl group-containing organopolysiloxane to said organohydrogenpolysiloxane is such that there are 0.5 to 5 silicon-bonded hydrogen atoms in the organohydrogenpolysiloxane per alkenyl group in the alkenyl group-containing organopolysiloxane.

16. An aqueous dispersion according to claim 1, wherein said surfactant is sodium diisobutyl sulfosuccinate, sodium dihexyl sulfosuccinate, sodium dicyclohexyl sulfosuccinate, sodium di(2-ethyl-hexyl) sulosuccinate or sodium dioctyl sulfosuccinate.

* * * * *